United States Patent [19]

Märkl

[11] 3,965,300

[45] June 22, 1976

[54] 200 MHZ CARRIER FREQUENCY SYSTEM WITH SEXTENARY GROUPS

[75] Inventor: Georg Märkl, Nurnberg, Germany

[73] Assignee: Tekade Felten & Guilleaume Fernmeldeanlagen GmbH, Nurnberg, Germany

[22] Filed: Apr. 23, 1974

[21] Appl. No.: 463,378

[52] U.S. Cl. ............................................ 179/15 FS
[51] Int. Cl.² ........................................... H04J 1/18
[58] Field of Search ........... 179/15 FS, 15 FD, 15 R

[56] References Cited
UNITED STATES PATENTS

| 3,342,941 | 9/1967 | Kondo | 179/15 FD |
| 3,495,188 | 2/1970 | Kopp | 179/15 FS |

OTHER PUBLICATIONS

Ericsson Review; vol. 48, No. 3, pp. 89–103; "Supermastergroup Translating Equipment for 60 MHz Carrier Telephone Systems."

*Primary Examiner*—Douglas W. Olms
*Attorney, Agent, or Firm*—Haseltine, Lake & Waters

[57] ABSTRACT

A carrier frequency system is provided with a transmission band of up to approximately 200 MHz with a small number of partial bands of identical magnitude and kind. These partial bands are translated and cut connected through and vice versa in their entirety into a frequency spectrum within the transmission band of a 60 MHz carrier frequency system of quinary group construction. The partial bands which are cut connected through into the other system are suitable for working with the translators of the other system in the same way as with its own partial bands. The filters required for the system are simple and uncomplicated.

2 Claims, 8 Drawing Figures

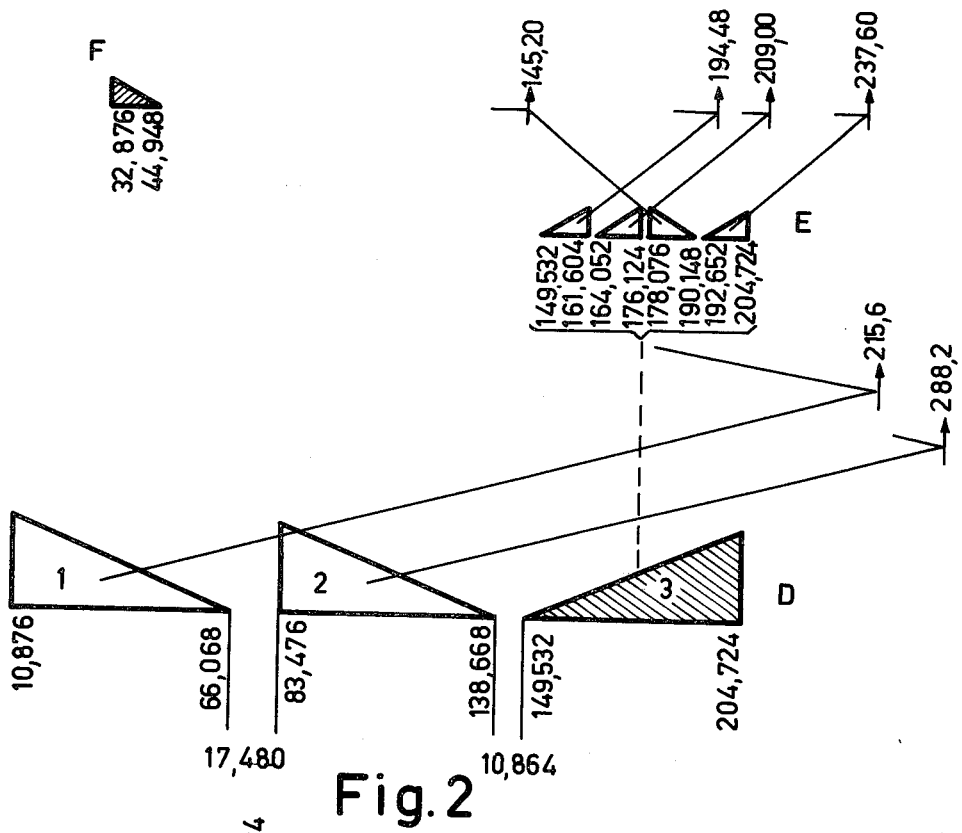
Fig. 2
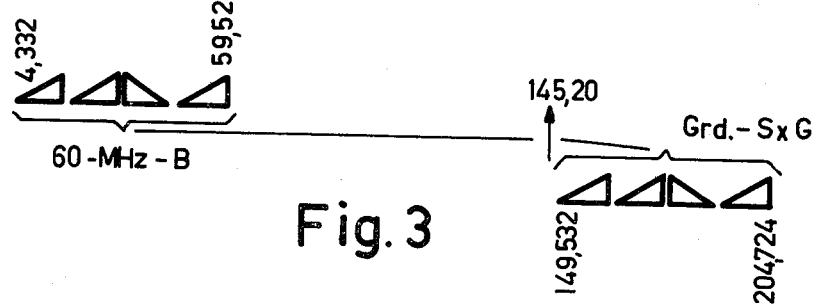
Fig. 3
```
145,20  = a x 33
194,48  = a x 44 + a/5
209,00  = a x 48 - a/2
237,60  = a x 54
215,60  = a x 49
288,20  = a x 65 + a/2
         a = 4,4 MHz
```
Fig. 4

200 MHZ CARRIER FREQUENCY SYSTEM WITH SEXTENARY GROUPS

FIELD OF THE INVENTION

The invention relates to a carrier frequency system for transmitting 32,400 speech channels by homospectral working, i.e. the outgoing and incoming transmission band have the same frequency spectrum. Its upper limiting frequency is, for example, approximately 200 MHz.

This carrier frequency system is intended principally for use with two separate coaxial cables. However, in principal, its use is not confined to metallic conductors, as evidenced for example by the use of carrier frequency systems with a smaller number of channels by homospectral working over directional radio links.

STATE OF THE ART

The article "Die Breitbandubertragungstechnik" published in "Revue, F.I.T.C.E.", October/November, 1971 introduces a frequency plan for a 200 MHz carrier frequency system in a survey of future large systems. In this proposal six quinary groups, each comprising four quaternary groups, are arranged above the transmission band of 4.332–59.684 MHz of the 60 MHz carrier frequency system which comprises twelve individual quaternary groups above the transmission band of 4.332 - as recommended by the Comite Consultatif International Telegraphique et Telephonique — referred to hereinbelow as CCITT — in recommendation G.333 of their White Book III.

This frequency allocation proposal suffers from a number of disadvantages. The intended 200 MHz transmission band is not uniform and comprises individual and independent quaternary groups as well as quinary groups. Although the four-part basic quinary group of 15.016 – 31.536 MHz is located within the frequency range of the 60 MHz transmission band, it is not part thereof. Moreover, it cannot be used as a junction stage for inter working between the 60 MHz and the 200 MHz transmission band because its quaternary groups do not coincide with the corresponding quaternary groups of the previously mentioned 60 MHz transmission band. Instead, this basic quinary group must be demodulated into basic quaternary groups each of which must then be individually connected through. Inter working between the 60 MHz system and the previously mentioned 200 MHz system without adopting the previously mentioned detour via the quaternary through group connection is possible only by making use of the branching technique in which the 200 MHz transmission band is divided, for example by means of hybrid transformers or diplexers and the lower part of this band is connected through with an unchanged frequency spectrum in the form of a 60 MHz transmission band to another transmission link. However, this branching technique permits common working of only one single 60 MHz transmission band with the 200 MHz transmission band; it does not permit any simple formation of a 200 MHz transmission band from three 60 MHz transmission bands which are supplied via extension circuits. Moreover, the branching technique is being progressively neglected and is no longer being considered for new system which are planned by the Federal German Post Office. A further disadvantage is due to the fact that the frequency spacings between the quinary groups are relatively narrow, taking into account the low coil Q at 31 MHz. The corresponding through quinary group filter would therefore call for a similar accumulation of inductors and crystals as the through quaternary group filter 8.516 – 12.388 MHz which is known to be very difficult and very complex and is associated with the known 12 MHz carrier frequency system V 2700; its stability would involve the same difficulties.

It should be mentioned that a similar nonhomogeneous frequency allocation has already been recommended by CCITT for a 12 MHz carrier frequency system (Plan 1B) but was hardly used substantially because of its disadvantages.

A carrier frequency system with a top limiting frequency of approximately 60 MHz has already been proposed for the transmission of 10800 speech channels and makes use of a frequency allocation which is different from the system defined in the CCITT recommendation G.333 (P 22 42 057.1). The proposed carrier frequency system prefers the transmission band 4.332 – 59.524 MHz. As shown in FIG. 1, it comprises four qulinary groups A and is built up over the basic quinary group B and therefore represents an example of a 60 MHz frequency system of quinary group configuration. The basic quintuplet group B has the frequency spectrum 32.876 – 44.948 MHz of the third quintuplet group A3 and is formed by direct translation of three CCITT fundamental quaternary groups C of 8.516 – 12.388 MHz or by direct translation of a CCITT transmission band V 2700 by using the upper side band.

The quaternary group carriers 49.280 MHz, 45.264 MHz and 32.560 MHz are used for translating the quaternary groups. The transmission band V 2700 is also translated with the 32.560 MHz carrier. The quinary groups are translated with the quinary group carriers 92.400 MHz, 63.800 MHz and 49.280 MHz.

The transmission band V 2700 covers the frequency spectrum of 4.332 – 12.388 MHz and according to CCITT specifications comprises three quaternary groups the upper group of which is also the CCITT basic quaternary group.

OBJECTS OF THE INVENTION

It is an object of the invention to disclose a carrier frequency system with a transmission band of up to approximately 200 MHz and comprising a small number of partial bands of identical magnitude and kind.

A second object is for these partial bands to be translated and connected through (and vice versa) in their entirety into a frequency spectrum within the transmission band of a 60 MHz carrier frequency system of quinary group construction.

A third object is for the partial bands which are connected through into the other system to be suitable for working with the translators of the said other system in the same way as its own partial bands.

Another object is to have the filters required for the system simpler and less complex than the expensive and complicated through quaternary group filter 8.516 – 12.388 MHz of the known 12 MHz carrier frequency system V 2700.

SUMMARY OF THE INVENTION

The above objects are achieved by a 200 MHz carrier frequency system for transmitting 32,400 speech channels by homospectral working in cooperation with a 60 MHz carrier frequency system of quinary group construction whose transmission band is not within the transmission band of the 200 MHz system and is therefore not part thereof and in which the transmission band comprises three sextanary groups each of which comprises four quinary groups, the basic sextanary groups being positioned at the upper end of the transmission band and its cut-off frequency as well as its internal structure is identical with a 60 MHz transmission band which is directly translated into the frequency spectrum of the aforementioned basic sextanary group and contains the basic quinary group and in which the frequency spacings between the sextanary groups are wider than the spacing between the two side bands which result from this translation, the fringe zone of the second side band, being suppressed with only a partial attenuation value, and transmitted together with the first side band which is used as the signal side band.

In one embodiment of the invention, the upper of the two side bands is used as signal side band (basic sextanary group) and the bottom side band is attenuated by only $\geq 40$ dB from its upper cutoff frequency down to a frequency of 0.144 MHz above the bottom sextanary group adjacent to the basic sextanary group and with respect to the signal side band and then fully suppressed with the internationally conventional value of $\geq 80$ dB only from this frequency onward.

BRIEF DESCRIPTION OF DRAWING

The invention will next be described and explained in detail by reference to the drawing. The figures of the drawing refer to one embodiment of the carrier frequency system according to the invention. The invention is not confined to the frequency data and other numerical values which apply to this embodiment but can also be employed with other values.

IN THE DRAWINGS

Figure 1:
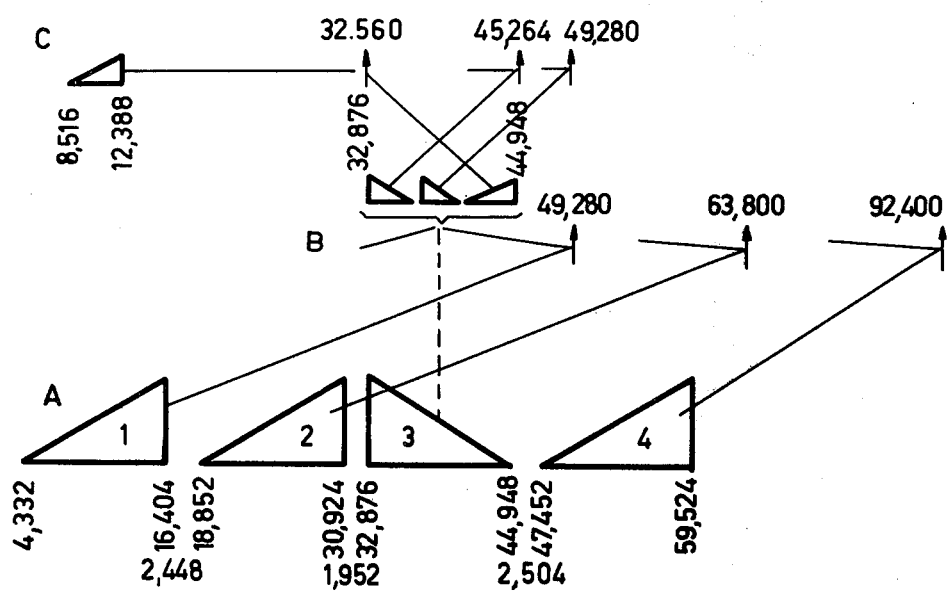
Figure 5:
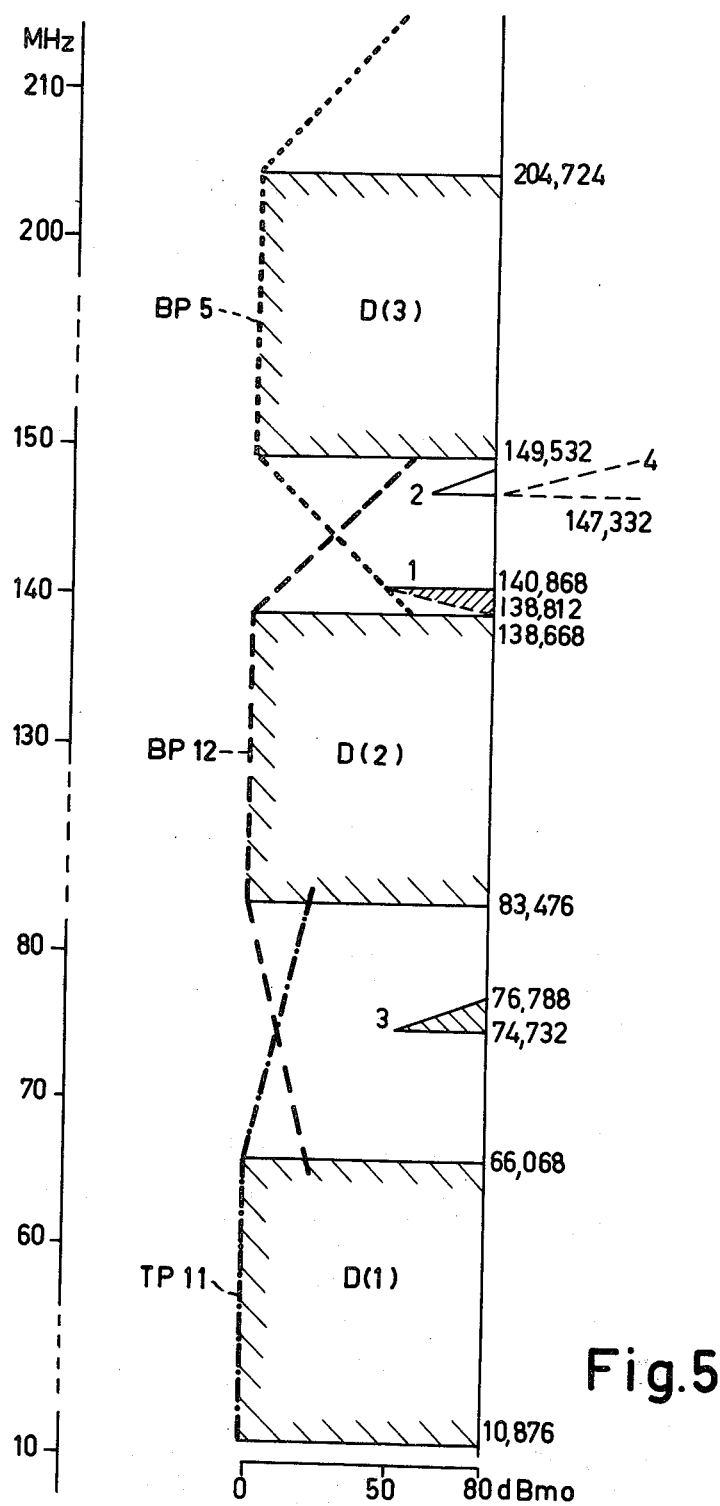
Figure 6:
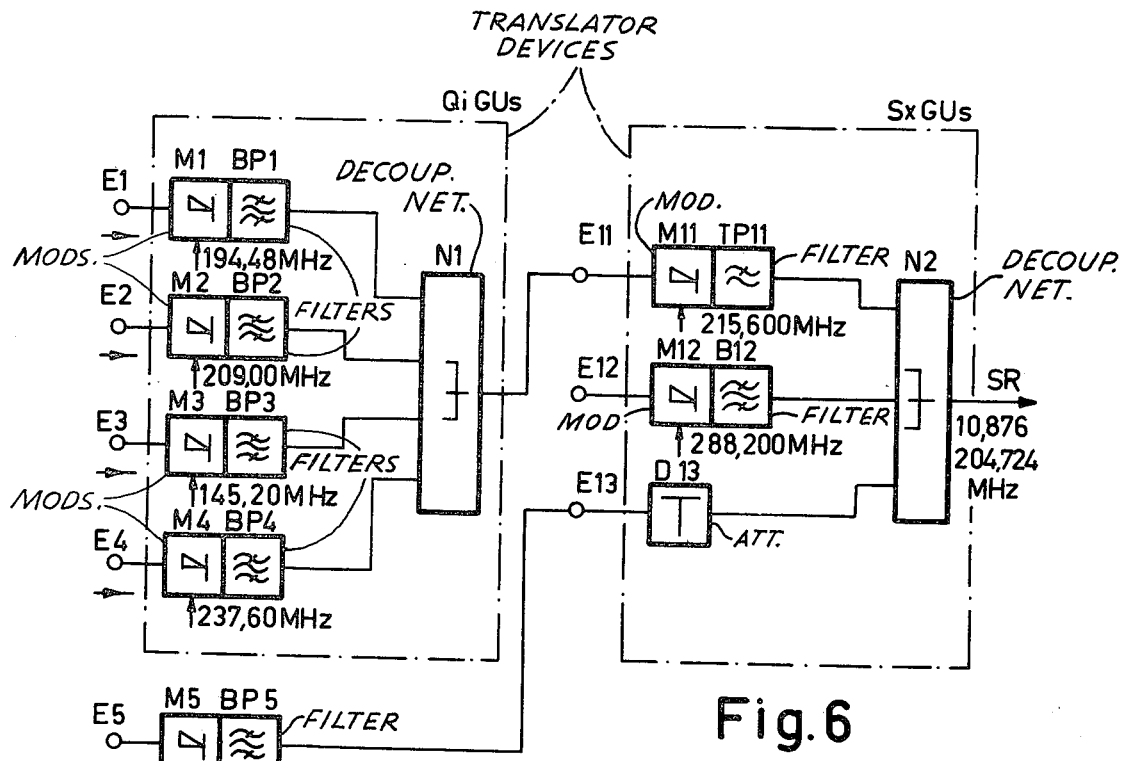
Figure 7:
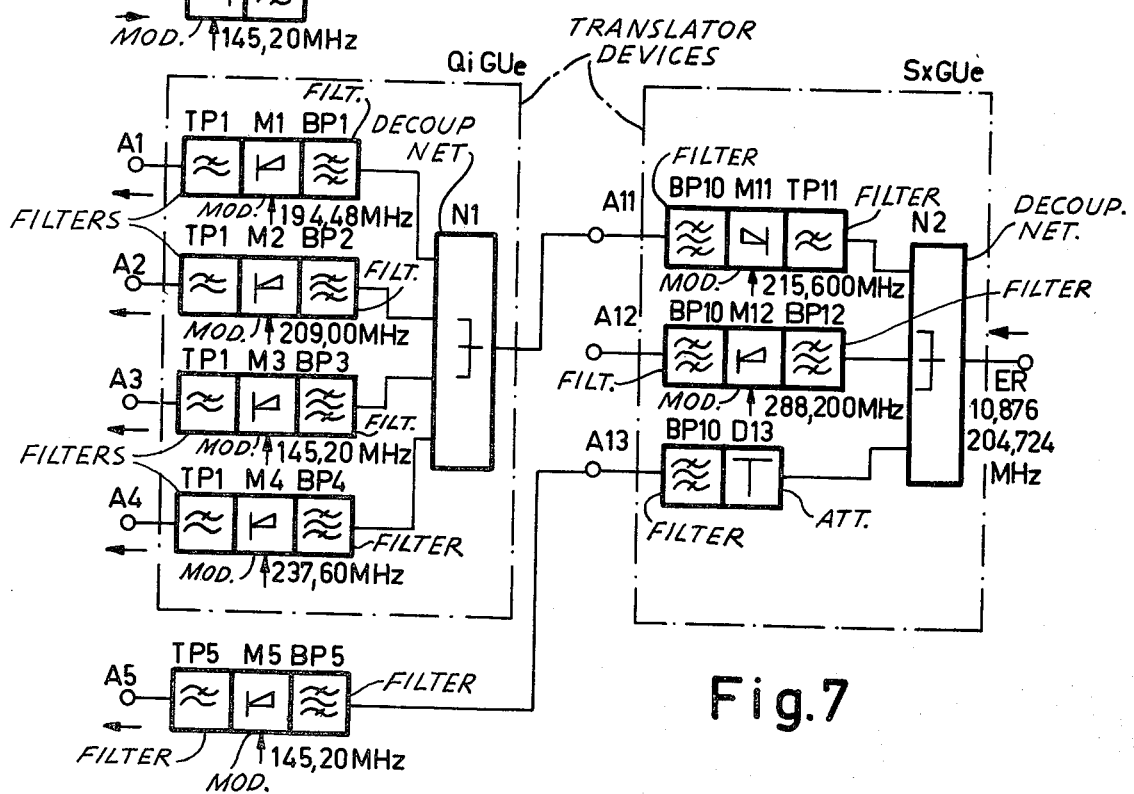
Figure 8:
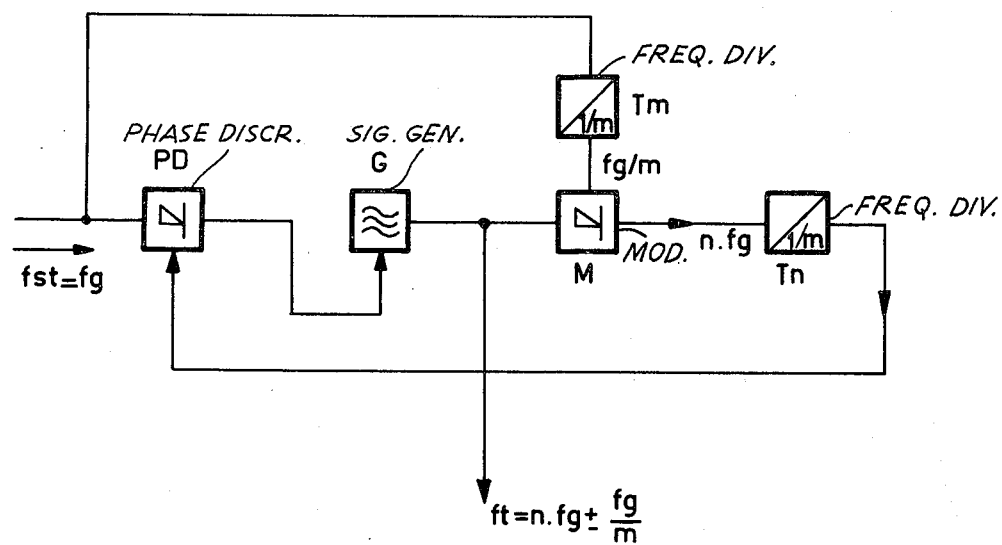

FIG. 1 shows a prior art system referred to above;

FIG. 2 shows the frequency allocation of the 200 MHz transmission band and the formation of the basic sextanary sextuplet group from basic quinary groups;

FIG. 3 shows the translation of the 60 MHz transmission band into the frequency spectrum of the basic sextanary group;

FIG. 4 is a table giving examples for producing the carrier frequencies used in the system from a basic frequency;

FIG. 5 shows the band residue obtained by translation of a 60 MHz transmission band or of a basic sextanary group;

FIG. 6 is a simplified block circuit diagram of an example relating to a circuit for forming a 200 MHz transmission band from basic quinary groups via sextanary groups and from a 60 MHz transmission band in the transmission direction;

FIG. 7 is a simplified block circuit diagram of an embodiment of a circuit for stepping down a 200 MHz transmission band in the reception direction; and FIG. 8 is a simplified block circuit diagram of a circuit for generating the carrier frequency.

DETAILED DESCRIPTION

The block circuit diagram shown in FIGS. 6 and 7 are confined only to the translating devices. Amplifiers, variable attenuators, means for feeding and evaluating pilot signals and measuring frequencies, equalizers and the like are not shown in the interests of clarity.

FIG. 2 shows the frequency allocation of the transmission band 10.876 – 204.724 MHz. It consists of three sextanary groups D each of which in turn comprises four quinary groups. The top sextanary group D3 is also the basic 149.532 – 204.724 MHz group E. To form the basic sextanary group four fundamental 32.876 – 44.948 MHz basic quinary groups are supplied via the inputs E1 - E4 of the transmission side quinary group translator device QiGUs (FIG. 6) to the modulators M1 - M4 and are then translated by the quinary group carriers 194.480 MHz, 209.000 MHz, 145.200 MHz or 237.600 MHz into the frequency spectrums 149.532 – 161.604 MHz, 164.052 – 176.124 MHz, 178.076 – 190.148 MHz or 192.652 - 204.724 MHz, any interfering modulation by-products being removed by means of the band-pass filters BP1 - BP4 and are finally combined via the decoupling network N1 to form the basic sextanary group E.

The frequency allocation plan of FIG. 3 shows another possibility for forming a basic sextanary group. A 60 MHz transmission band of quinary group construction is translated with the carrier 145.200 MHz in the modulator M5 (FIG. 6). And interfering modulation by-products are removed by means of the band-pass filter BP5.

Two basic sextanary groups are supplied via the inputs E11 and E12 to the modulators M11 and M12 of the transmission-side sextanary group translator device SxGUs to be translated with the sextanary group carriers 215.600 MHz or 288.280 MHz, interfering modulation by-products being removed by means of the low-pass filter TP11 or by means of the band-pass filter BP12. A third basic sextanary group is supplied to the input E13 of the transmission-side sextanary group translator SxGUs. Translation of this basic sextanary group is not necessary since it already has the frequency spectrum of the sextanary group D3 so that it is merely necessary to insert an attenuator D13 in place of the omitted modulator. The previously mentioned three sextanary groups are combined with the decoupling network N2 to form the transmission band 10.876 - 204.724 MHz which is transmitted in the transmission direction SR.

FIG. 7 shows the step-down of the 200 MHz transmission band. Analogous procedures take place in the opposite direction and sequence and corresponding devices have the same symbols. The transmission band is supplied from the reception direction ER to the decoupling network N2 the outputs of which are connected to the low-pass filter TP11, to the band-pass filter BP12 and to the attenuator D13. The individual sextanary groups are filtered by rough preselection in the previously mentioned filters and are supplied to the translators N11 and N12. The filters also protect the modulators against being loaded by the entire frequency band. This applies also to amplifiers which are not shown. Two sextanary groups are translated by the translators M11 or M12 with the carrier frequencies 215.600 MHz or 288.280 MHz into the frequency spectrum of the basic sextanary group. The band-pass filters BP10 which are connected downstream of the translators M11 and M12 are provided for the removal of interfering modulation by-products and to obtain the desired signal band. No translation is again required for the third sextanary group and an attenuator D13 is merely inserted. Filtering from the transmission band in this case isperformed by the band-pass filter BP10. The three basic sextanary groups can be picked-off for further processing from the outputs A11, A12 and A13.

In the illustrated example the output A11 is connected to a quinary group translator QiGUe which steps down a basic sextanary group into basic quinary groups while the output A13 is connected to a translator for translating a basic sextanary group into the frequency spectrum of the 60 MHz transmission band. These arrangements are merely exemplified since a plurality or even all basic sextanary groups could be stepped down into basic quinary groups or could be passed on as 60 MHz transmission bands after suitable translation.

The decoupling network N1 of the reception-side quinary group translator QiGUe applies a basic sextanary group to the band-pass filters BP1 - BP4. Preselection is similar to that of the selection device of the sextanary group translater takes place in the said band-pass filters. The translators M1 - M4 translate the individual quinary groups with the appropriate carriers 194.48 MHz, 209.00 MHz, 145.20 MHz or 237.60 MHz into the frequency spectrum of the basic quinary group. The succeeding low-pass filters TP1 filter out the desired basic quinary group from the remaining modulation products and this desired group will then be available at the outputs A1 - 4.

To translate a basic sextanary group into the 60 MHz transmission band it is first supplied to the band-pass filter BP5 which removes any band residues from the group. The group is then translated with the carrier 145.200 MHz in the translator M5 into the frequency spectrum 4.332 - 12.388 MHz and interfering modulation by-products are removed by means of the low-pass filter TP5.

OPERATION OF PREFERRED EMBODIMENT

As shown by the exemplified embodiment the partial bands of the 200 MHz transmission band, the sextanary groups, are given the same magnitude as the 60 MHz transmission band and their four quinary groups are made to coincide with the four quinary groups of a 60 MHz transmission band that has been translated with 145.200 MHz (FIG. 2 and FIG. 3).

It is also advantageous to apply the fundamental sextanary group to the top end of the 200 MHz transmission band because if the 60 MHz transmission band is directly translated in the frequency spectrum of this fundamental sextanary group the quinary groups of the translated band will be in a spectrum which is such that to form the fundamental sextanary group from fundamental quinary groups these can be made to coincide by direct translation with the quinary groups of the translated 60 MHz transmission band without any interfering modulation products 2T-M appearing in the own signal band.

Due to direct translation of basic quinary groups these steps on the one hand permit the formation of the basic sextanary group with minimum effort and on the other hand insure particularly simple and close co-working between the 60 MHz and the 200 MHz system. This is because it is not only one single 60 MHz transmission band that connected be cut through into the 200 MHz transmission band or conversely one sextanary group can be connected through into the frequency spectrum of the 60 MHz transmission band without sub-division into several smaller partial bands but in addition it is also possible for a 200 MHz transmission band to build up directly from three 60 MHz transmission bands and vice versa without the need for dividing these into partial bands.

The two side bands which are obtained by the direct translation of the 60 MHz band into the frequency spectrum of the fundamental sextanary group according to FIG. 3 have a frequency spacing of $2 \times 4.332$ MHz = 8.664 MHz. The upper side band of these two side bands is used as the signal side band and the undesired lower side band is suppressed. It is also feasible to utilize a carrier frequency which is higher by approximately 120 MHz, i.e. approximately 265, MHz, and to use the lower of the two side bands thus produced and to suppress the upper side band. However, the use of the upper side band of a pair of bands which are at a correspondingly lower level offers the advantage that the filter flank for suppressing the undesired side band is located at the bottom end of the filter pass range where it is less steep in terms of the relative frequency scale than a filter flank above the same pass range, given a spacing between the two side bands of 8.664 MHz in both cases.

According to International Conventions, the undesired lower side band is to be suppressed by 80 dB with respect to the single side band. Although the band-pass filter require to this end can be constructed much more simply than the previously mentioned quadruplet by-pass filter, owing to the wide frequency spacing of 8.644 MHz, the conditions governing the construction of the filter are improved still further by the steps described below in view of the low coil Q factors which are obtained at very high frequencies of the order of magnitude of 200 MHz.

The frequency spacing between the sextuplet groups is made larger than 8.664 MHz and the undesired lower side band is not yet suppressed with the internationally conventional value of 80 dB at its upper fringe frequency of 140.868 MHz (FIG. 5) but is suppressed only with a partial attenuation of $\geq 40$ dB. Full suppression at $\geq 80$ dB commences only from 0.144 MHz onwards above the sextuplet group 2 at a frequency of 138.812 MHz. A band residue 1 therefore remains whose level drops from $\leq 40$ dBmO to $\leq -80$ dBmO with a diminishing frequency. (Levels specified in "dBmO" refer to the spacing of a signal, for example a pilot signal, carrier residue and the like, from the nominal system level.). The level values of the sextanary groups and band residues shown in FIG. 5 can be obtained from the level scale at the bottom on FIG. 5. In the interests of simplicity it was assumed that the attenuation characteristic of the filter flanks was rectilinear. In practice, this is not the case, but it does not alter the principle on which these considerations are based.

By moving the 80 dB blocking zone from the pass range of a band pass filter by 140.868 MHz $-138.812$ MHz = 2.065 MHz it becomes much easier to construct such a filter.

A minimum value of 40 dB is selected for the partial attenuation at 140.868 MHz for the following reason: if a 60 MHz transmission band is translated into the fundamental sextuplet group which is retranslated into a 60 MHz transmission band after transmission via a 200 MHz line the signals will pass twice through the band-pass filter required to this end (band-pass filter BP5 once each in FIG. 6 and FIG. 7). The band residues are therefore suppressed at least by $2 \times 40$ dB, i.e. $\geq 80$ dB with respect to the signal band. They will therefore always be below the permissible cross-torque attenuation level of $-80$ dBmO and are therefore harmless. In this context it is immaterial as to whether these band residues contain only the image frequencies of the own band which require suppression through only 40 dB according to International Convention or whether they contain frequencies of external bands which are responsible for intelligible cross-talk.

The partial attenuation of 40 dB is also sufficient to prevent interference with pilot signals and measuring frequencies by band residues which could fall adjacent to a fundamental quinary group in the course of stepping down a sextanary group with band residues into four fundamental quinary groups followed by quinary group by-passing. For example, in stepping down the sextanary group 2, above which is the band residue 1 according to FIG. 5, the sextanary group 2 must first be translated into the frequency spectrum of the basic sextanary group. The band residue 1 will then occur as a band residue 2 which is additionally suppressed by approximately 20 dB to $= \leq 60$ dBmO by the modulation band-pass filter BP10 and by the band-pass filter BP12 (FIG. 7). It will then be 50 dB below the level of the pilot signal and measuring frequencies which have a level of $-10$ dBmO according to CCITT.

Since a spacing of at least 40 dB between the pilot signal and the interference source is sufficient according to CCITT it follows that the band residue 2 will maintain the required signal to noise ratio. Moreover, the band residue 2 is reduced still further by the quinary group filter, for which for example the band-pass filter BP4 could be used, in the course of quinary group connecting through in which interference with the pilot signals of another system could be considered. Accordingly, all frequencies of the band residue are below $-80$ dBmO after passing through the quinary group filter and are therefore completely uncritical.

If a basic sextanary group with a band residue 1 is translated into the frequency spectrum of the sextanary group 1 or 2, this band residue will occur as a band residue 3 or 4 respectively. The level of this band residue 3 or 4 is reduced still further by the modulation low-pass filters TP11 or by the band-pass filter BP12 (FIG. 6) with respect to the original band residue 1 which has already been proved to be harmless. When the sextanary groups 1 or 2 are retranslated into the frequency spectrum of the basic sextanary group, the level of these band residues will be again reduced by the associated modulation filters. This also applies to every further sextanary group translation.

The previously mentioned step by means of which the undesired lower side band is already suppressed by 0.144 MHz above the sextuplet group 2 at the full attenuation value of 80 dB offers the following advantage when stepping down sextanary groups into basic quaternary groups through fundamental quinary groups followed by group cut through operation. The full attenuation of 80 dB is provided by the CCITT quaternary group by-pass filter only at a frequency spacing of 0.144 MHz so that band residues which are closer than 0.144 MHz to the upper fringe quaternary group of the sextanary group 2 are not sufficiently suppressed by the CCITT quaternary group by-pass filter. However, by the above-mentioned step these are also reduced to a signal to noise ratio of $\leq -80$ dBmO. Band residues with a spacing from the fringe quaternary group greater than 0.144 MHz are suppressed below the interference limit by the quaternary group filter. These band residues play no part for those quaternary groups of a sextanary group which are located further towards the inside. The fundamental quaternary groups which are derived from a sextanary group do not in any way differ from the basic quaternary groups of the previous CCITT frequency allocations, even after quaternary group connecting through.

The connecting through groups obtained from division of the sextanary groups are not always free of band residues. However, this is no disadvantage because the quinary groups can also be subjected to band residues in the proposed 60 MHz carrier frequency system of quinary group construction. Moreover, the CCITT has not defined any quinary groups nor any exclusive use of clean quinary groups which would have to be taken into account.

Despite these band residues there is a completely clean frequency range of more than 6 MHz width between the sextanary groups which is available for pilot signals and measuring frequencies (FIG. 5).

Efforts will of course initially be made to avoid these band residues if the filters required to this end can be constructed with a tolerable expenditure. The transmission of such band residues will therefore be confined to cases in which problems of filter construction make this appear to be advisable.

The carrier frequencies which are used in the exemplified embodiment are derived from a basic frequency $fg = 4.4$ MHz by multiplying a division thereof using the known phase locked loop method. This also permits the formation of frequencies which do not represent integral multiples of the fundamental frequency fg. FIG. 8 shows a block circuit diagram of an exemplified embodiment of a circuit which operates by this method to provide carrier frequencies of 194.48 MHz, 209.000 MHz and 288.20 MHz none of which are integral multiples of 4.4 MHz. The required carrier frequency ft is generated by a single signal generator G. This generator G need not have the specified high degree of frequency stability of the appropriate carrier frequency ft and does not therefore call for a high expenditure. To obtain the necessary frequency stability the system supplied with the very accurate control frequency fst which is used directly as the fundamental frequency fg in the illustrated embodiment. The frequency ft = n × fg ± fg/m, produced by the generator G, is supplied to a modulator M where it is modulated with the frequency fg/m which is produced in a by-pass by the frequency divider Tm by division of the fundamental frequency fg through the factor m. Modulation eliminates the term fg/m of the frequency ft to produce the frequency n × fg which is supplied to a further divider Tn in which it is stepped down to the basic frequency fg. This is supplied to the phase discriminator PD where it is compared with the basic frequency fg which was originally supplied. If deviations occur the generator G is correspondingly corrected by the phase discriminator. The frequency divider Tn and the modulator M are omitted for the carrier frequencies 145.20 MHz, 237.60 MHz and 215.60 MHz which are integral multiples of fg = 4.4 MHz.

I claim:

1. A 200-MHz carrier frequency method having a transmission band for the transmission of 32,400 speech channels by homospectral method in cooperation with a 60 MHz carrier frequency system of quinary group construction whose transmission band is separate from the transmission band of the 200 MHz method and is therefore no part thereof, in which method the 200 MHz transmission band comprises three sextanary groups, each containing four quinary groups, said method comprising allocating the 200-

MHz transmission band such that the basic sextanary group is at the upper end of the 200-MHz transmission band and coincides with regard to its cut-off frequency as well as with regard to its internal structure with a 60 MHz transmission band which is directly translated into the frequency spectrum of the said basic sextanary group and contains the basic quinary group, forming the sextanary groups of the 200 MHz transmission band such that the frequency spacings between the sextanary groups are larger than the spacing between two side bands produced as a result of the said translation, suppressing the fringe zone of the second side band with only a partial attenuation value and transmitting the same together with the first side band which is used as a signal side band.

2. Carrier frequency method according to claim 1, in which the upper of the two side bands is used as signal side band including a basic sextanary group and the lower side band is attenuated by only $\geq 40$dB from its top cut-off frequency to a frequency of 0.144 MHz above the lower sextanary group adjacent the basic sextanary group and with respect to the signal side band and is suppressed with the value of $\geq 80$ dB only from this frequency onwards.

* * * * *